US010554655B2

(12) United States Patent
Zhang et al.

(10) Patent No.: US 10,554,655 B2
(45) Date of Patent: *Feb. 4, 2020

(54) METHOD AND SYSTEM FOR VERIFYING AN ACCOUNT OPERATION

(71) Applicant: TENCENT TECHNOLOGY (SHENZHEN) COMPANY LIMITED, Shenzhen (CN)

(72) Inventors: Xiaolong Zhang, Shenzhen (CN); Yonglong Wei, Shenzhen (CN); Wen Zha, Shenzhen (CN); Lifang Cen, Shenzhen (CN); Junhong Yan, Shenzhen (CN); Wenhao Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,522

(22) Filed: Dec. 13, 2018

(65) Prior Publication Data
US 2019/0124076 A1    Apr. 25, 2019

Related U.S. Application Data

(63) Continuation of application No. 15/154,298, filed on May 13, 2016, now Pat. No. 10,200,362, which is a
(Continued)

(30) Foreign Application Priority Data

Jan. 24, 2014    (CN) .......................... 2014 1 0035894

(51) Int. Cl.
*H04L 9/00*    (2006.01)
*H04L 29/06*    (2006.01)
(Continued)

(52) U.S. Cl.
CPC .......... *H04L 63/0853* (2013.01); *G06F 21/36* (2013.01); *H04L 63/18* (2013.01);
(Continued)

(58) Field of Classification Search
CPC ....................................................... H04L 9/00
See application file for complete search history.

(56) References Cited

U.S. PATENT DOCUMENTS 8,627,438 B1    1/2014  Bhimanaik
2006/0282660 A1   12/2006  Varghese et al.
(Continued)

FOREIGN PATENT DOCUMENTS

CN    101375546 A    2/2009
CN    102325062 A    1/2012
(Continued)

OTHER PUBLICATIONS

European Search Report issued by the European Patent Office (EPO) dated Feb. 8, 2017 for EP3044987.
(Continued)

*Primary Examiner* — Josnel Jeudy
(74) *Attorney, Agent, or Firm* — Anova Law Group, PLLC

(57) ABSTRACT

Method and server system for user login verification are disclosed. The method includes: obtaining a verification request from a first device for an account operation requested by a user using a first account; identifying, from the server system, usage history data associated with the first account, including data regarding usage of the first account on the first device; determining, in accordance with the data regarding the usage of the first account on the first device and one or more predetermined usage history criteria, whether the account operation associated with the first account on the first device is safe; and in accordance with a
(Continued)

determination that the account operation associated with the first account on the first device is not safe, initiating a verification process based on a second device that qualifies as being safe for the account operation.

20 Claims, 16 Drawing Sheets

Related U.S. Application Data continuation of application No. PCT/CN2015/070328, filed on Jan. 8, 2015.

(51) Int. Cl.
   *H04W 4/80* (2018.01)
   *H04W 12/06* (2009.01)
   *G06F 21/36* (2013.01)
   *G06F 21/31* (2013.01)
   *H04M 15/00* (2006.01)

(52) U.S. Cl.
   CPC ............ *H04W 4/80* (2018.02); *H04W 12/06* (2013.01); *G06F 21/316* (2013.01); *H04M 15/47* (2013.01)

(56) References Cited

U.S. PATENT DOCUMENTS

| | | |
|---|---|---|
| 2013/0167208 A1 | 6/2013 | Shi |
| 2013/0219479 A1 | 8/2013 | Desoto et al. |
| 2014/0026189 A1 | 1/2014 | Huang |

FOREIGN PATENT DOCUMENTS

| | | |
|---|---|---|
| CN | 102740141 A | 10/2012 |
| CN | 103532797 A | 1/2014 |
| CN | 104144419 A | 11/2014 |

OTHER PUBLICATIONS

Office Action issued by The State Intellectual Property Office of the Peoples Republic of China dated Nov. 3, 2015 for CN Application No. 201410035894.8, China.

Office Action issued by The State Intellectual Property Office of the Peoples Republic of China dated Mar. 3, 2016 for CN Application No. 201410035894.8, China.

International Search Report issued by the State Intellectual Property Office of the Peoples Republic of China dated Apr. 17, 2015 for PCT/CN2015/070328.

METHOD AND SYSTEM FOR VERIFYING AN ACCOUNT OPERATION

PRIORITY CLAIM AND RELATED APPLICATIONS

This application is a continuation application of U.S. patent application Ser. No. 15/154,298, filed on May 13, 2016. U.S. patent application Ser. No. 15/154,298 is a continuation of International Patent Application No. PCT/CN2015/070328, filed on Jan. 8, 2015. This application claims the benefit and priority of Chinese Patent Application No. 201410035894.8, filed on Jan. 24, 2014. The entire disclosure of each of the above applications is incorporated herein by reference.

FIELD OF THE INVENTION

The disclosed embodiments relate to the field of computers, and in particular, to methods and systems for verifying an account operation.

BACKGROUND OF THE INVENTION

When using the Internet, a user may ensure the security of a user account by setting account verification information or using an account verification tool, so that situations such as malicious or accidental account operations, such as an accidental deletion of the user account can be prevented. For example, verification is performed by inputting a preset account password, and inputting a verification code received by a mobile phone bound to the user account beforehand, using a third-party verification platform such as an OpenID, and/or OAuth (open identification system). Verification may also be performed using a hardware device such as a password card, a USB key (mobile digital certificate), or an RSA (asymmetric cryptographic algorithm) certificate. However, when an internet user account is directly logged in on a mobile device, user account verification cannot be performed without setting account verification information, and the cost of using an account verification tool is high. In general, even when the account verification information is set, or an account verification tool is used, the account verification still suffers from low security, low reliability, and insufficiency in preventing a malicious deletion behavior of an account hacker.

SUMMARY OF THE INVENTION

The embodiments of the present disclosure provide methods and systems for verifying an account operation.

In some embodiments, a method for verifying an account operation is performed at a server system with one or more processors, and memory. The method includes: obtaining a verification request from a first device for an account operation requested by a user using a first account, the verification request including information associated with the first account and a device ID associated with the first device; identifying, from the server system, usage history data associated with the first account, including data regarding usage of the first account on the first device; determining, in accordance with the data regarding the usage of the first account on the first device and one or more predetermined usage history criteria, whether the account operation associated with the first account on the first device is safe; and in accordance with a determination that the account operation associated with the first account on the first device is not safe, initiating a verification process based on a second device that qualifies as being safe for the account operation based on the usage history data associated with one or more accounts of the user and the one or more predetermined usage history criteria.

In some embodiments, a server system, includes one or more processors, and memory storing one or more programs for execution by the one or more processors, the one or more programs include instructions for performing the operations of any of the methods described herein.

In some embodiments, a non-transitory computer readable storage medium stores one or more programs, the one or more programs include instructions, which, when executed by a server system, cause the server system to perform the operations of any of the methods described herein. In some embodiments, a server system includes means for performing, or controlling performance of, the operations of any of the methods described herein.

Various advantages of the present application are apparent in light of the descriptions below.

BRIEF DESCRIPTION OF THE DRAWINGS

For a better understanding of the aforementioned aspects of the application as well as additional aspects and embodiments thereof, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION OF THE EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solutions of the present application are clearly and completely described below with reference to the accompanying drawings. It is obvious that embodiments to be described are only a part rather than all of the embodiments of the present application. All other embodiments obtained by a person of ordinary skill in the art based on the embodiments of the present application without creative efforts shall fall within the protection scope of the present application.

In some embodiments of the present application, a computer system for account verification includes a server, and a user may log in to an account on a mobile device, such as a tablet computer, a smart phone, or may log in to an account through a client module on a mobile device, where the client module in the mobile device is, for example, a webpage browser client, an instant messaging client (such as QQ, WeChat, Weibo), and/or the like. A method, a system, and a device for account verification provided in the embodiments of the present application are applicable to various systems, such as an e-commerce system and/or an instant messaging application, which requires account verification. For example, account verification is performed on an account in an e-commerce system, for a login to an account in an instant messaging application system, or during one or more account operations, such as an account deletion.

Figure 1:
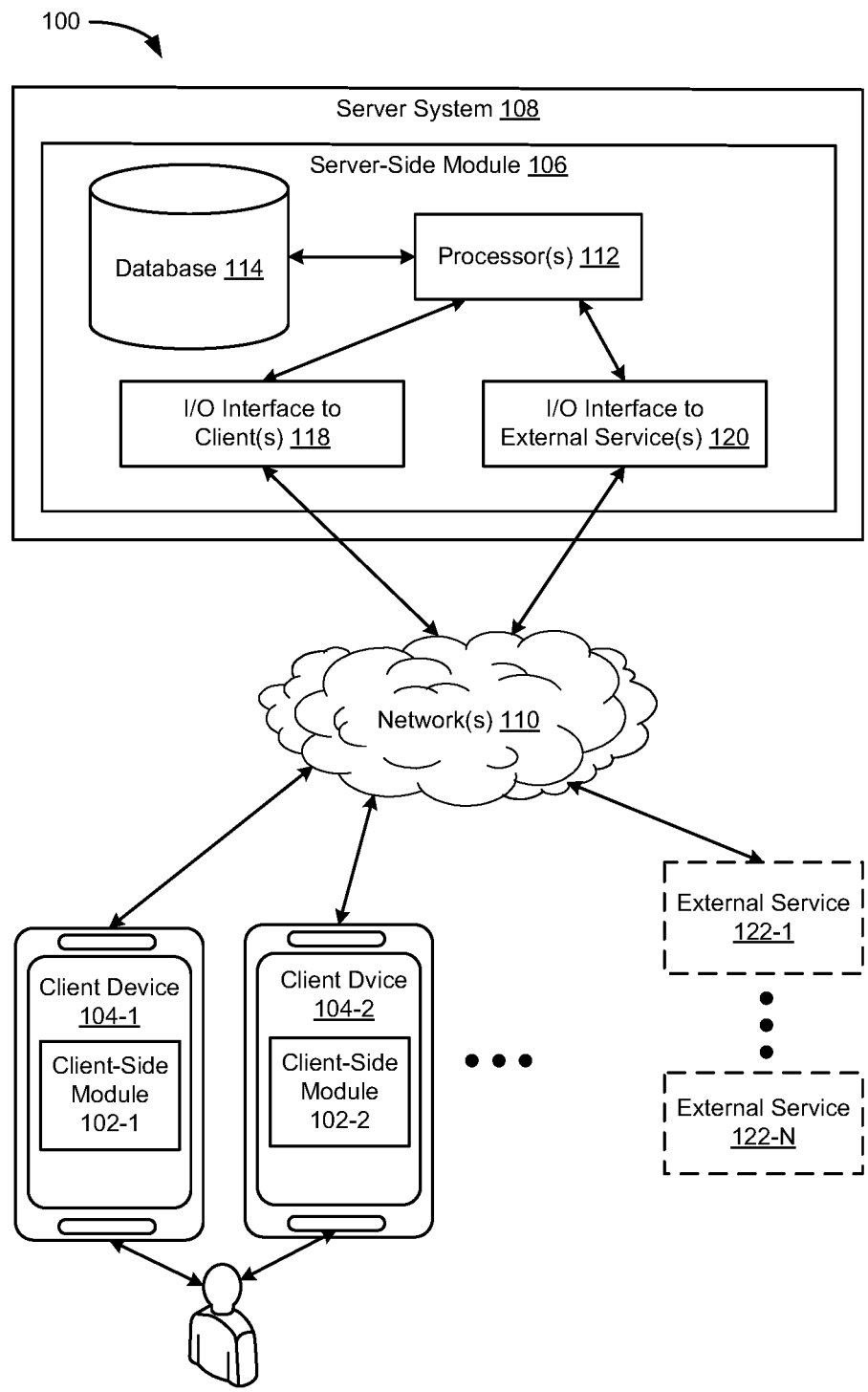
FIG. 1 is a block diagram of a server-client environment in accordance with some embodiments.

As shown in FIG. 1, the account verification is implemented in a server-client environment 100 in accordance with some embodiments. In some embodiments, server-client environment 100 includes client-side processing 102-1, 102-2 . . . (hereinafter "client-side module 102") executed on a client device 104-1, 104-2 . . . , and server-side processing 106 (hereinafter "server-side module 106") executed on a server system 108. Client-side module 102 communicates with server-side module 106 through one or more networks 110. Client-side module 102 provides client-side functionalities (e.g., instant messaging, and social networking services) and communications with server-side module 106. Server-side module 106 provides server-side functionalities (e.g., instant messaging, and social networking services) for any number of client modules 102 each residing on a respective client device 104.

In some embodiments, server-side module 106 includes one or more processors 112, one or more databases 114, an I/O interface to one or more clients 118, and an I/O interface to one or more external services 120. I/O interface to one or more clients 118 facilitates the processing of input and output associated with the client devices for server-side module 106. One or more processors 112 obtain requests for performing account operations from one or more client devices 104, process the requests, identify usage data associated with the user account on the one or more client devices, verify the account information on the one or more client devices, and send the account verification results in response to the requests to client-side modules 102 of one or more client devices 104. The database 114 stores various information, including but not limited to, account information associated with each user, device information associated with each user account, and usage data associated with each user account on a certain client device. The database 114 may also store a plurality of record entries relevant to the activities of respective accounts of each user, and devices associated with each user. I/O interface to one or more external services 120 facilitates communications with one or more external services 122 (e.g., merchant websites, credit card companies, social network platforms, and/or other processing services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2A:
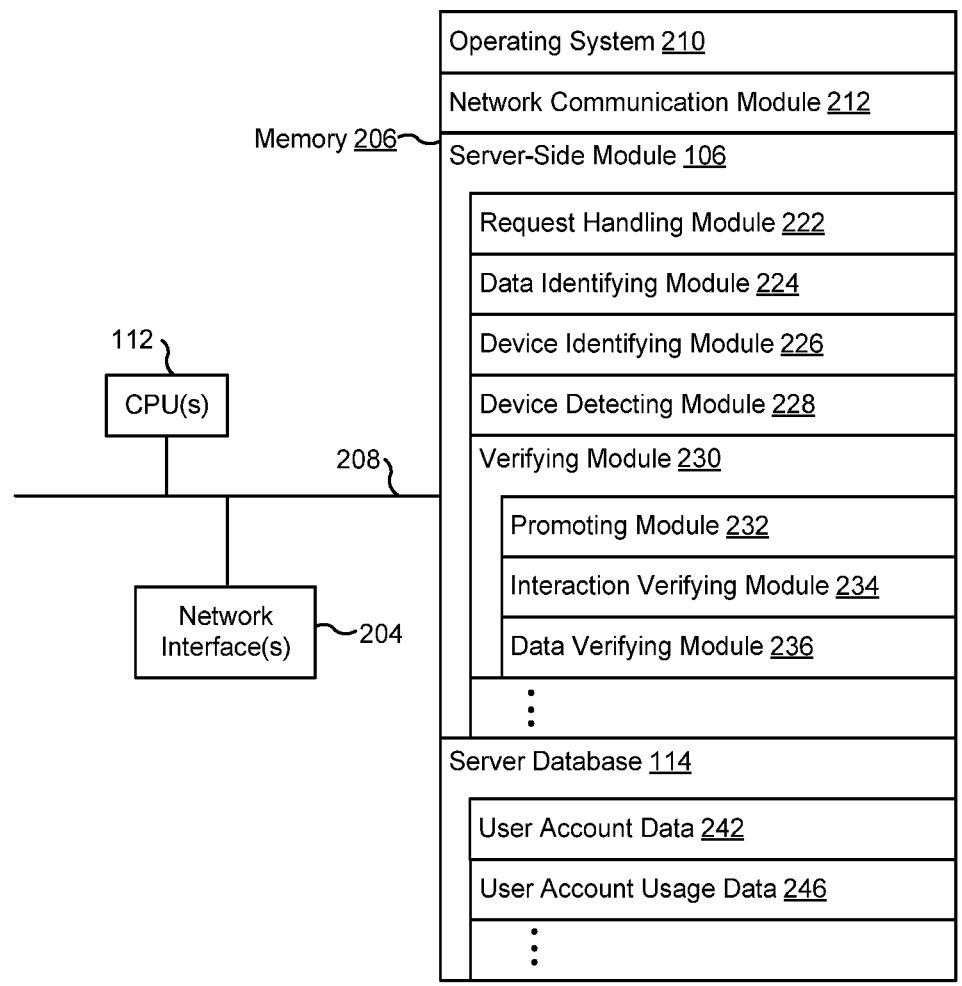
FIG. 2A is a block diagram of a server system in accordance with some embodiments.

FIG. 2A is a block diagram illustrating a server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

operating system 210 including procedures for handling various basic system services and for performing hardware dependent tasks;

network communication module 212 for connecting server system 108 to other computing devices (e.g., client devices 104 and external service(s) 122) connected to one or more networks 110 via one or more network interfaces 204 (wired or wireless);

server-side module 106, which provides server-side data processing (e.g., user account verification, instant messaging, and social networking services), includes, but is not limited to:

request handling module 222 for handling and responding to various requests sent from client devices, including requests for user account verification associated with account operations;

data identifying module 224 for identifying usage data associated with a user account, including data regarding usage of the user account on a client device associated with the user;

device identifying module 226 for identifying a client device which qualifies as being safe for a user account operation based on the usage history data associated with the user account and one or more predetermined usage history criteria;

device detecting module 228 for detecting a client device being logged into with one or more user accounts associated with a user of the client device;

verifying module 230 for verifying user account operation, including, but not limited to:

promoting module 232 for promoting a user to perform an interaction for the purpose of verification, such as sending an encoded image for display on a client device qualified as being safe, and promoting the user to scan the encoded image using the client device to be verified for the account operation;

interaction verifying module 234 for verifying the interaction results, such as comparing the encoded image scanned by the client device with the encoded image generated and sent to the client device qualified as being safe; and data verifying module 236 for verifying the identified usage data to determine whether the identified usage data match one or more predetermined criteria; and one or more server database 114 storing data for the social networking platform, including but not limited to:

user account data 242 storing user profiles for a plurality of users, wherein a respective user profile for a user may include one or more accounts of the user, login credentials for each user account, payment data (e.g., linked credit card information, app credit or gift card balance, billing address, shipping address, etc.) associated with each user account, custom parameters (e.g., age, location, hobbies, etc.) for the user, and social network contacts associated with each user account; and user account usage data 246 storing device information associated with each user account, and usage data of each user account on each client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 2B:
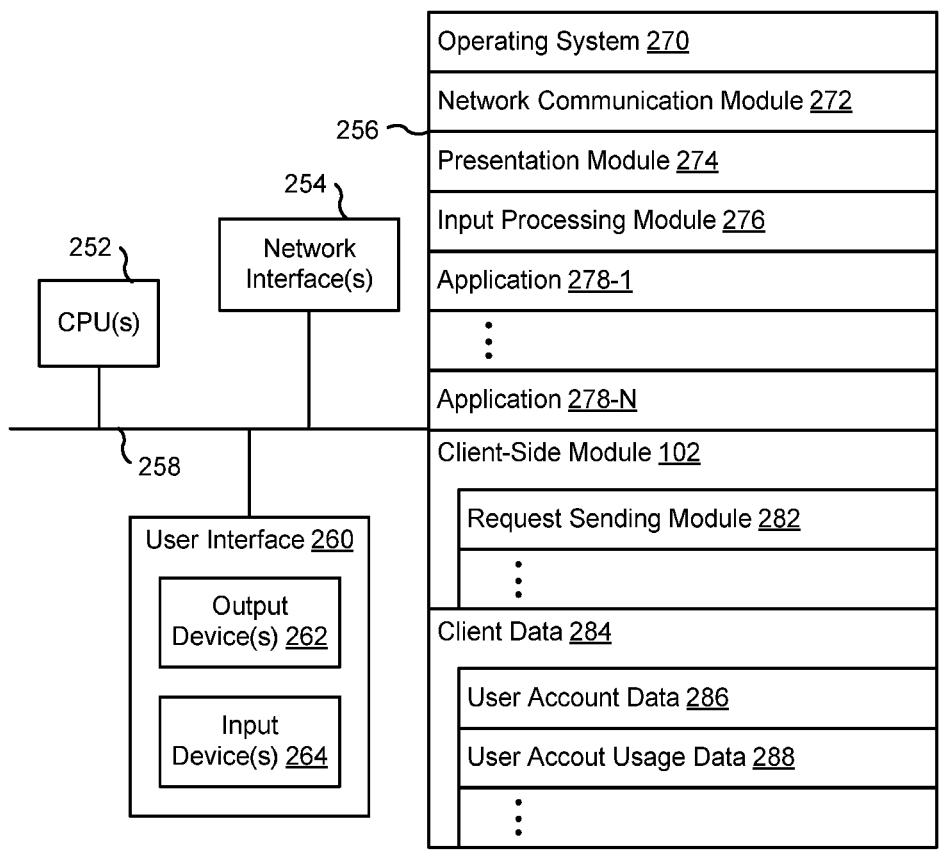
FIG. 2B is a block diagram of a client device in accordance with some embodiments.

FIG. 2B is a block diagram illustrating a representative client device 104 in accordance with some embodiments. Client device 104, typically, includes one or more processing units (CPUs) 252, one or more network interfaces 254, memory 256, and one or more communication buses 258 for interconnecting these components (sometimes called a chipset). Client device 104 also includes a user interface 260. User interface 260 includes one or more output devices 262 that enable presentation of media content, including one or more speakers and/or one or more visual displays. User interface 260 also includes one or more input devices 264, including user interface components that facilitate user input such as a keyboard, a mouse, a voice-command input unit or microphone, a touch screen display, a touch-sensitive input pad, a camera (e.g., for scanning an encoded image), a gesture capturing camera, or other input buttons or controls. Furthermore, some client devices 104 use a microphone and voice recognition or a camera and gesture recognition to supplement or replace the keyboard.

Memory 256 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 256, optionally, includes one or more storage devices remotely located from one or more processing units 252. Memory 256, or alternatively the non-volatile memory within memory 256, includes a non-transitory computer readable storage medium. In some implementations, memory 256, or the non-transitory computer readable storage medium of memory 256, stores the following programs, modules, and data structures, or a subset or superset thereof:

operating system 270 including procedures for handling various basic system services and for performing hardware dependent tasks;

network communication module 272 for connecting client device 104 to other computing devices (e.g., server system 108 and external service(s) 122) connected to one or more networks 110 via one or more network interfaces 254 (wired or wireless);

presentation module 274 for enabling presentation of information (e.g., a user interface for a social networking platform, widget, webpage, game, and/or application, audio and/or video content, text, and/or displaying an encoded image for scanning) at client device 104 via one or more output devices 264 (e.g., displays, speakers, etc.) associated with user interface 260;

input processing module 276 for detecting one or more user inputs or interactions from one of the one or more input devices 264 and interpreting the detected input or interaction (e.g., processing the encoded image scanned by the camera of the client device);

one or more applications 278-1-278-N for execution by client device 104 (e.g., games, application marketplaces, payment platforms, social network platforms, and/or other applications involving various user operations);

client-side module 102, which provides client-side data processing and functionalities, including but not limited to:

request sending module 282 for generating and sending requests for verifying one or more account operations; and client data 284 storing data of a user associated with the client device, including, but is not limited to:

user account data 286 storing one or more user accounts associated with a user of client device 104, the user account data including one or more user accounts, login credentials for each user account, payment data (e.g., linked credit card information, app credit or gift card balance, billing address, shipping address, etc.) associated with each user account, custom parameters (e.g., age, location, hobbies, etc.) for each user account, social network contacts of each user account; and user account usage data 288 storing usage data of each user account on client device 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 256, optionally, stores a subset of the modules and data structures identified above. Furthermore, memory 256, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2A-2B, respectively, are merely illustrative, and different configurations of the modules for implementing the functions described herein are possible in various embodiments.

Figure 3A:
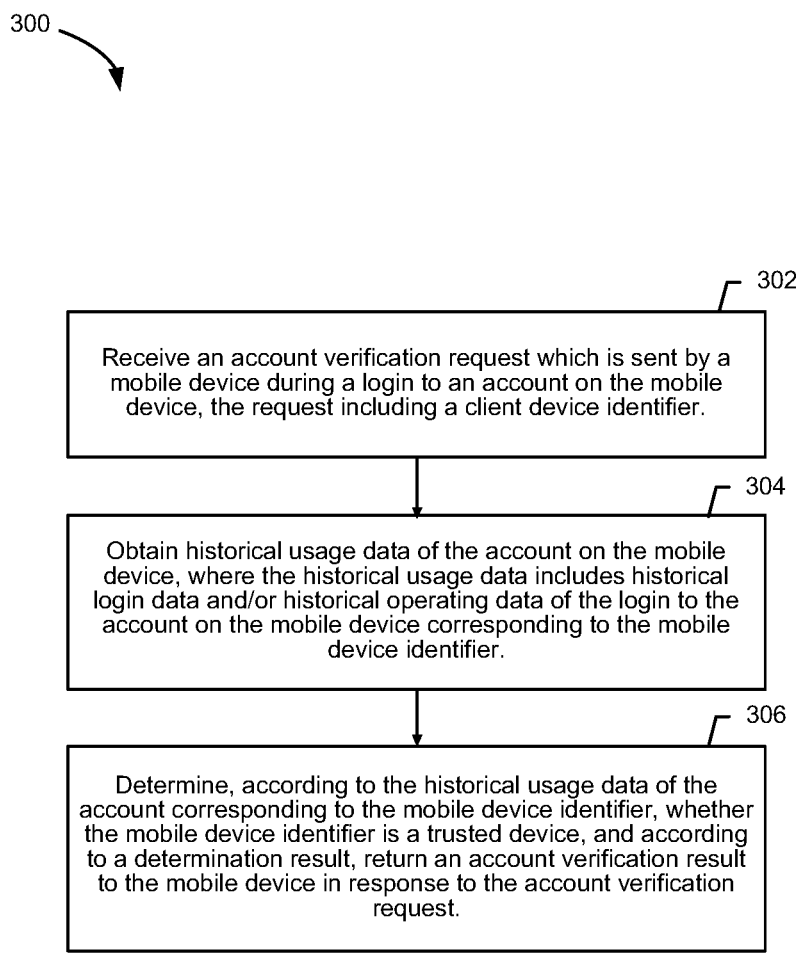
FIG. 3A is a flow chart of a method for verifying an account operation in accordance with some embodiments.

FIG. 3A is a flow chart of a method 300 for verifying an account operation in accordance with some embodiments. In some embodiments, method 300 is executed by a computer system (e.g., server system 108, FIGS. 1 and 2A) for verifying the account operation. Server system 108 receives (302) an account verification request which is sent by a mobile device (e.g., client device 104-1, FIGS. 1 and 2B) during a login to an account on mobile device 104-1. The account verification request includes a mobile device identifier (e.g., device ID).

Server system 108 obtains (304) historical usage of the account on mobile device 104-1 associated with the mobile device identifier. The historical usage data includes historical login data and/or historical operating data of the login to the account on mobile device 104-1 corresponding to the mobile device identifier.

Server system 108 determines (306), according to the historical usage data of the account on mobile device 104-1, whether the mobile device 104-1 associated with the mobile device identifier is a trusted device (i.e., a safe device). According to a determination result, server system 108 returns an account verification result to mobile device 104-1 in response to the account verification request.

In some embodiments, prior to receiving (302) the account verification request, server system 108 further generates two-dimensional code information and sends the two-dimensional code information to a target page, so that the target page generates a two-dimensional code according to the two-dimensional code information and displays the two-dimensional code on the target page.

In some embodiments, server system 108 generates two-dimensional code information, where the two-dimensional code information is information used for verifying account operation, such as an account login process, and server system 108 may dynamically generate two-dimensional code information according to different accounts. The two-dimensional code information may be a character string such as a token of WeChat, and server system 108 delivers the generated two-dimensional code information to a target page, where the target page may be a display page on a terminal device (e.g., client device 104-2, FIG. 1) such as a personal computer or a notebook computer. In some embodiments, terminal device 104-2 has been verified as being safe for a user account operation. In some embodiments, the target page may be a webpage or a page stored in terminal device 104-2. In some embodiments, the target page receives the two-dimensional code information, then generates a two-dimensional code according to the two-dimensional code information, and displays the two-dimensional code on the target page. Mobile device 104-1 is then required to scan the two-dimensional code in the target page by using a camera of mobile device 104-1, and parse the scanned two-dimensional code to obtain the two-dimensional code information to verify a login to an account on mobile device 104-1. In some embodiments, the two-dimensional code is, for example, a Quick Response (QR, a type of a two-dimensional code), and the like.

In some embodiments, prior to receiving (302) the account verification request, server system 108 further (1) obtains login operating data during a login to an account on mobile device 104-1; (2) determines whether the acquired login operating data of the account matches predetermined unsafe criteria, e.g., predetermined unsafe operating data; and (3) if the obtained login operating data of the account matches the predetermined unsafe criteria, sends an account verification instruction to mobile device 104-1. The account verification instruction may request for the device identifier associated with mobile device 104-1. In such implementations, mobile device 104-1 sends an account verification request including a device identifier according to the account verification instruction.

In some embodiments, system server 108 may acquire login operating data during a login to an account on mobile device 104-1. The login operating data includes login data during the login to the account and usage data after the login to the account. The login data, for example, account login data, during the login to the account, may further include a login address, a login platform, a login manner, and the like. The usage data includes, for example, a deletion operation of the account, a query for personal data, such as a personal identity, a mobile phone number, a friend of the account, a query for property information of the account, a change to the property information of the account, and the like.

Server system 108 determines whether the obtained login operating data of the account matches the predetermined unsafe criteria, e.g., predetermined unsafe operating data. In accordance with a determination that the obtained login operating data matches the predetermined unsafe criteria, server system 108 sends an account verification instruction to mobile device 104-1, so that mobile device 104-1 can send, according to the account verification instruction, to server system 108, an account verification request including the device identifier associated with mobile device 104-1. In some embodiments, the predetermined unsafe criteria include, but is not limited to: deleting the account, changing the property information of the account, one-time operating data such as property-related fraud information to be sent to a friend during instant messaging.

In some embodiments, the obtained login operating data of the account may be parsed and tokenized to obtain multiple keywords, and then the multiple keywords are compared with keywords in the predetermined unsafe operation data. If a keyword in the login operating data matches a keyword in the unsafe operating data, it is determined that the obtained login operating data of the account matches the predetermined unsafe criteria, and an account verification instruction is sent to mobile device 104-1, so that mobile device 104-1 can send, according to the account verification instruction to server system 108, the account verification request including the mobile terminal identifier. Therefore, detection and determination of an unsafe account operation can be implemented, and if it is determined that an unsafe account operation occurs, method 300 of FIG. 3A is executed, and account verification needs to be performed on the account to ensure security and reliability of the account operation.

In some embodiments, the account verification request sent from mobile device 104-1 during a login to an account and received (302) by server system 108 includes a device identifier. In some embodiments, the account verification request includes, but is not limited to, two-dimensional code information obtained by mobile device 104-1 scanning a two-dimensional code displayed on a target page and parsing the scanned two-dimensional code. The account verification request may further include other verification information, such as a password and a one-time pass code, inputted for the account. Server system 108 receives the account verification request which is sent by mobile device 104-1 and includes the mobile device identifier, where the mobile device identifier is a unique identifier of mobile device 104-1. In some embodiments, the mobile device identifier may be a unique hardware identifier of the mobile device, such as an embedded multimedia card identity (EMMC ID, which is a globally unique hardware identity of EMMC Flash, and is a 32-bit hexadecimal numerical value), a mobile equipment identifier identity (ME ID, which is a globally unique 56-bit mobile terminal identifier identity), and an International Mobile Equipment Identity (IMEI). The mobile terminal identifier may also be an identifier generated in a combination manner according to the hardware identifier of the mobile terminal.

In some embodiments, the historical data of an account corresponding to the mobile device identifier is obtained, where the historical data includes historical login data and/or historical operating data of the login to the account on mobile device 104-1 corresponding to the mobile device identifier. In some embodiments, the historical login data is the data obtained during a login to the account on mobile device 104-1. In some embodiments, the account login data includes, but is not limited to, a login frequency within a preset period, and the account login data may further include: a login Internet Protocol (IP), a login platform, or a login manner. The login platform is, for example, a mobile phone login client or a webpage login client. The login manner information is, for example, an automatic login, a login after input of a login protection answer, or a login after input of an account password.

The login frequency within a preset period may be the total number of logins within the preset period, and the preset period is a preset and editable period of time, such as 18 hours, 3 days, 15 days, and 30 days. The login frequency within a preset period is that, for example, there are 6 logins to WeChat on mobile device 104-1 within the last 15 days. In some embodiments, the preset period may further include multiple preset sub-periods, so the login frequency within a preset period includes that: the number of logins in each preset sub-period is greater than 1. For example, the preset period is 3 days, and each preset sub-period is 1 day, so the number of logins to WeChat on mobile device 104-1 each day is greater than 1.

The historical operating data includes, but is not limited to, a usage duration. The historical operating data further includes all operating records from a login to the account. Specifically, the use duration is a time interval from a login to the account and a latest operating record after the login to the account. For example, there are 2 logins to the account within one day. The first login takes place at 11:25, and the operating records are kept at 11:23, 12:00, . . . , 12:15, and 13:25. The second login takes place at 14:00. Therefore, within the time before the second login, the time, when an operating record is kept, closest to the second login is determined as the latest operating time in the first login, that is, 13:25 is determined as the latest operating time and it is calculated that the use duration is 2 hours.

In some embodiments, the historical data may further include a preset trusted identifier or a preset key. The preset trusted identifier is a mobile device identifier stored at server system 108 beforehand, and is a mobile device identifier which has passed security verification (i.e., qualified as being safe). The preset key is a key dynamically generated by server system 108 according to a preset algorithm, and the dynamically generated key is included in data exchanged on mobile device 104-1 each time, where mobile device 104-1 cannot decrypt the key. Server system 108 implements both the generation and parsing of the key, and the preset key delivered by server system 108 is included in the data returned by mobile device 104-1 to server system 108, so that server system 108 can perform decryption and verification on the preset key.

In some embodiments, server system 108 determines (306), according to the historical data of the account corresponding to the mobile device identifier, whether the mobile device identifier is a trusted identifier, and according to a determination result, an account verification response corresponding to the account verification request is returned to mobile device 104-1.

In some embodiments, if the historical login data includes a login frequency within a preset period, and the historical operating data includes a use duration, the determining whether the mobile device identifier is a trusted identifier according to the historical data of the account corresponding to the mobile device identifier may specifically include: if the login frequency within the preset period meets a preset frequency threshold, and/or the use duration meets a preset time threshold, server system 108 determines that the mobile device identifier is a trusted identifier.

For example, if an account 1 is logged in to on a mobile device 1, a preset period is 15 days, there are in total 8 logins to the account 1 by a client in mobile device 1 within 15 days, and a preset frequency threshold is at least 5 logins within 15 days, it can be determined that a mobile device identifier of mobile device 1 is a trusted identifier. If an account 2 is logged in to on a mobile device 2, a preset period is 3 days, there are 2 logins each day to the account 2 by a client in mobile device 2 within three days, a login frequency within the preset period is at least 2 logins each day, and a preset frequency threshold is that the number of logins in each preset sub-period is greater than 1, it can be determined that a mobile device identifier of mobile device 2 is a trusted identifier. If an account 3 is logged in to by a client on a mobile device 3, a use duration is 3 hours, and a preset time threshold is more than 2 hours, it can be determined that a mobile device identifier of mobile device 3 is a trusted identifier.

In some embodiments, if the login frequency within a preset period does not meet the preset frequency threshold, and/or the use duration does not meet the preset time threshold, it is determined that the mobile device identifier is an untrusted identifier.

In some embodiments, whether the historical data includes: a preset trusted identifier, the determining whether the mobile device identifier is a trusted identifier according to the historical data of the account corresponding to the mobile device identifier may specifically include determining whether the mobile device identifier is identical with the preset trusted identifier, if yes, the mobile device identifier is determined to be a trusted identifier.

The trusted identifier is a mobile device identifier added in server system 108 beforehand, and is a mobile device identifier which has passed security verification. If a preset trusted identifier that is identical on the mobile device identifier is found in the stored preset trusted identifiers, it is determined that the mobile device identifier is a trusted identifier.

In some embodiments, if the mobile device identifier is not identical with the preset trusted identifier, it can be verified in other manners whether the mobile device identifier is a trusted identifier.

In some embodiments, if the historical data includes: a preset key. After receiving (302) the account verification request, method 300 may further include parsing an account verification request to obtain a key of the account verification request. Determining (306) whether the mobile device identifier is a trusted identifier according to the acquired historical data of an account corresponding to the mobile device identifier may further include determining whether the key of the account verification request is identical with the preset key, if yes, the mobile device identifier is determined to be a trusted identifier.

The preset key is a key dynamically generated by the server system 108 according to a preset algorithm, and if the key of the account verification request obtained through parsing is identical with the preset key, it is determined that the device identifier is a trusted identifier.

In some embodiments, if it is determined, according to the acquired historical data of the account corresponding to the mobile device identifier, that the mobile device identifier is a trusted identifier, a positive response to the account verification request is returned to the mobile device. Otherwise, a negative response to the account verification request is returned to the mobile device. In some embodiments, after the positive response to the account verification request is returned to the mobile device, verification information, such as a password or a one-time pass code, sent by the mobile device, may also be received, so as to further perform verification of the account.

In method 300 for account verification provided in the present application, an account verification request sent by a mobile device can be received, where the account verification request includes a mobile device identifier. Historical data of an account corresponding to the mobile device identifier can be obtained. It can be determined according to the acquired historical data of the account corresponding to the mobile device identifier whether the mobile device identifier is a trusted identifier. In accordance with a determination that, an account verification response corresponding to the account verification request can be returned to the mobile device. Therefore, in some implementations of the present application, it is determined, according to historical data of an account corresponding to a mobile device identifier, whether the mobile device identifier is a trusted identifier, so as to perform verification for security and reliability of a mobile device on which the account is logged in to, and the security and reliability of account verification are improved.

Figure 3B:
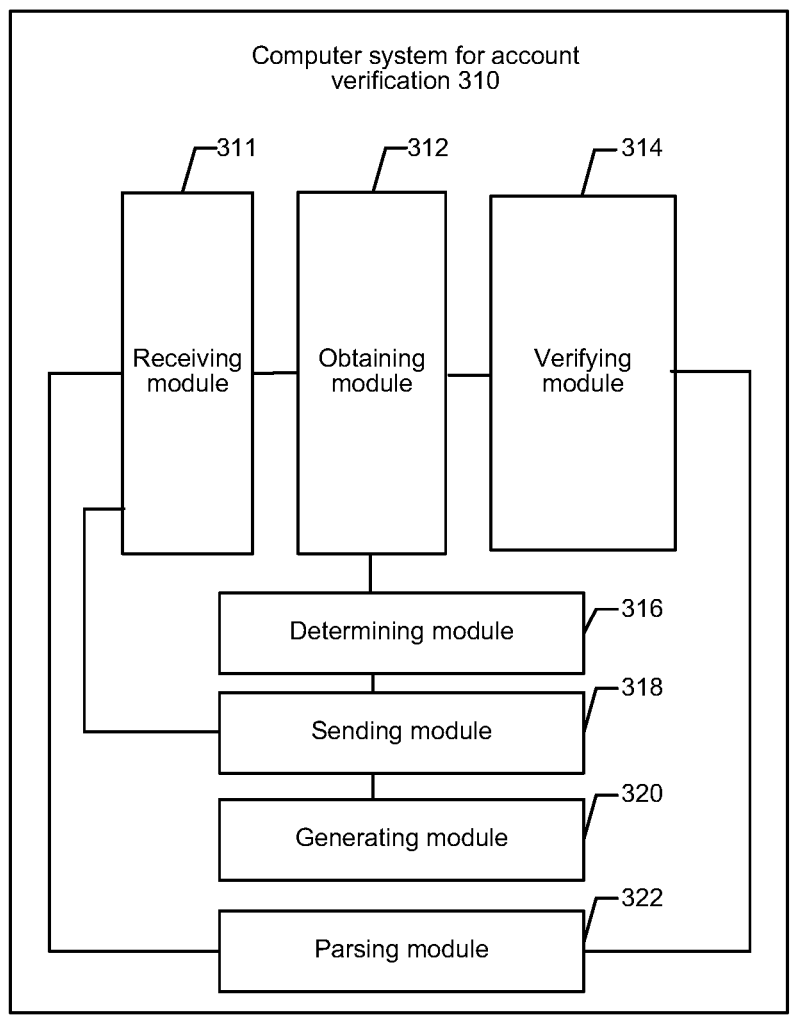
FIG. 3B is a schematic block view of a computer system for verifying an account operation in accordance with some embodiments.

FIG. 3B is a schematic block view of a computer system 310 (e.g., server system 108) for verifying an account operation in accordance with some embodiments. Computer system 310 of FIG. 3B for account verification is used to execute method 300 according to the embodiment shown in FIG. 3A of the present application. For ease of description, only parts related to the embodiment of the present application are shown, and for undisclosed specific technical details, reference may be made to the embodiment shown in FIG. 3A of the present application.

As shown in FIG. 3B, computer system 310 includes: a receiving module 311, an obtaining module 312, and a verifying module 314. In some embodiments, computer system 310 may further include: a generating module 320 and a sending module 318. In some embodiments, generating module 320 is used for generating two-dimensional code information. Sending module 318 is used for sending the two-dimensional code information to a target page, so that the target page generates a two-dimensional code according to the two-dimensional code information, and displays the two-dimensional code on the target page. In some embodiments, computer system 310 may further include a determining module 316.

Obtaining module 312 is used for obtaining login operating data during the login to the account on the mobile device. Determining module 316 is used for determining whether the obtained login operating data of the account matches predetermined unsafe criteria, e.g., predetermined unsafe operating data. Sending module 318 is used for, when determining module 316 determines the obtained login operating data matches the predetermined unsafe criteria, sending an account verification instruction to the mobile device. In some embodiments, obtaining module 312 obtains the login operating data during a login to an account on a mobile device.

Receiving module 311 is used for receiving the account verification request which is sent by the mobile device during a login to an account. Obtaining module 312 is used for obtaining historical data of the account corresponding to the mobile device identifier. Verifying module 314 is used for determining whether the mobile device identifier is a trusted identifier according to the historical data of the account corresponding to the mobile device identifier, and according to a determination result, returning an account verification response corresponding to the account verification request to the mobile device.

Figure 3C:
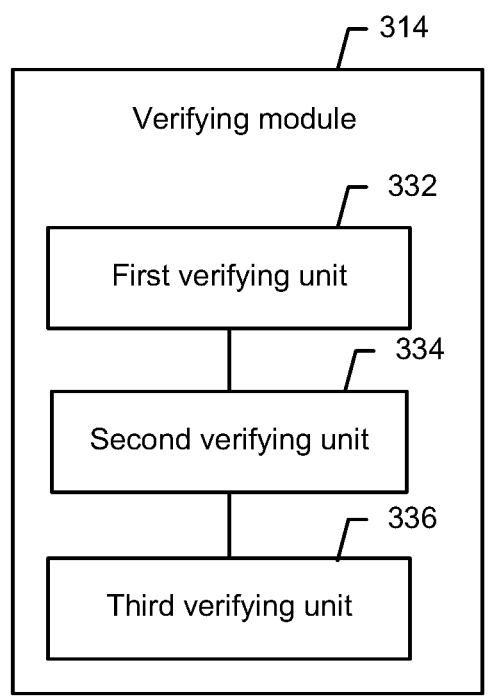
FIG. 3C is a schematic block view of a verifying module of the computer system for verifying an account operation in accordance with some embodiments.

FIG. 3C is a schematic block view of a verifying module 314 of the computer system for verifying an account operation in accordance with some embodiments. Verifying module 314 may include one or more units, such as a first verifying unit 332, a second verifying unit 334, and a third verifying unit 336.

In some embodiments, if the historical login data includes a login frequency within a preset period, and the historical operating data includes a use duration, first verifying unit 332 is used for determining whether the mobile device identifier is a trusted identifier by comparing the login frequency within a preset period with a preset frequency threshold, and/or comparing the use duration with a preset time threshold.

In some embodiments, first verifying unit 332 is further used for determining the mobile device identifier is an unsafe identifier, when the login frequency within a preset period does not meet the preset frequency threshold, and/or the use duration does not meet the preset time threshold.

In some embodiments, if the historical data includes a preset trusted identifier, second verifying unit 334 is used for determining that the mobile device identifier is a trusted identifier when the mobile device identifier is identical with the preset trusted identifier.

In some embodiments, if the mobile device identifier is not identical with the preset trusted identifier, first verifying unit 332 or third verifying unit 336 may perform verification to find whether the mobile device identifier is a trusted identifier.

Referring back to FIG. 3B, in some embodiments, if the historical data includes a preset key, computer system 310 further includes a parsing module 322. Parsing module 322 is used for parsing the account verification request to obtain a key of the account verification request.

In FIG. 3C, third verifying unit 336 is used for determining that the mobile device identifier is a trusted identifier when the key of the account verification request is identical with the preset key.

In some embodiments, verifying module 314 is further used for returning an account verification failure response to the mobile terminal, when the mobile device identifier is determined to be an unsafe identifier. In some embodiments, after an account verification success response is returned to the mobile device, receiving module 311 may further receive verification information, such as a password or a one-time pass code, sent by the mobile device, so that further verifying module 314 may further be performed.

In computer system 310 for account verification provided the present application, receiving module 311 can receive an account verification request sent by a mobile device; obtaining module 312 can obtain historical data of an account corresponding to the mobile device identifier; verifying module 314 can determine, according to the obtained historical data of the account corresponding to the mobile device identifier, whether the mobile device identifier is a trusted identifier, and according to a determination result, return an account verification response corresponding to the account verification request to the mobile device. Therefore, in some implementations of the present application, it is determined, according to historical data of an account corresponding to a mobile device identifier, whether the mobile device identifier is a trusted identifier, so as to perform verification for security and reliability of a mobile device on which the account is logged in to, and the security and reliability of account verification are improved.

Figure 4A:
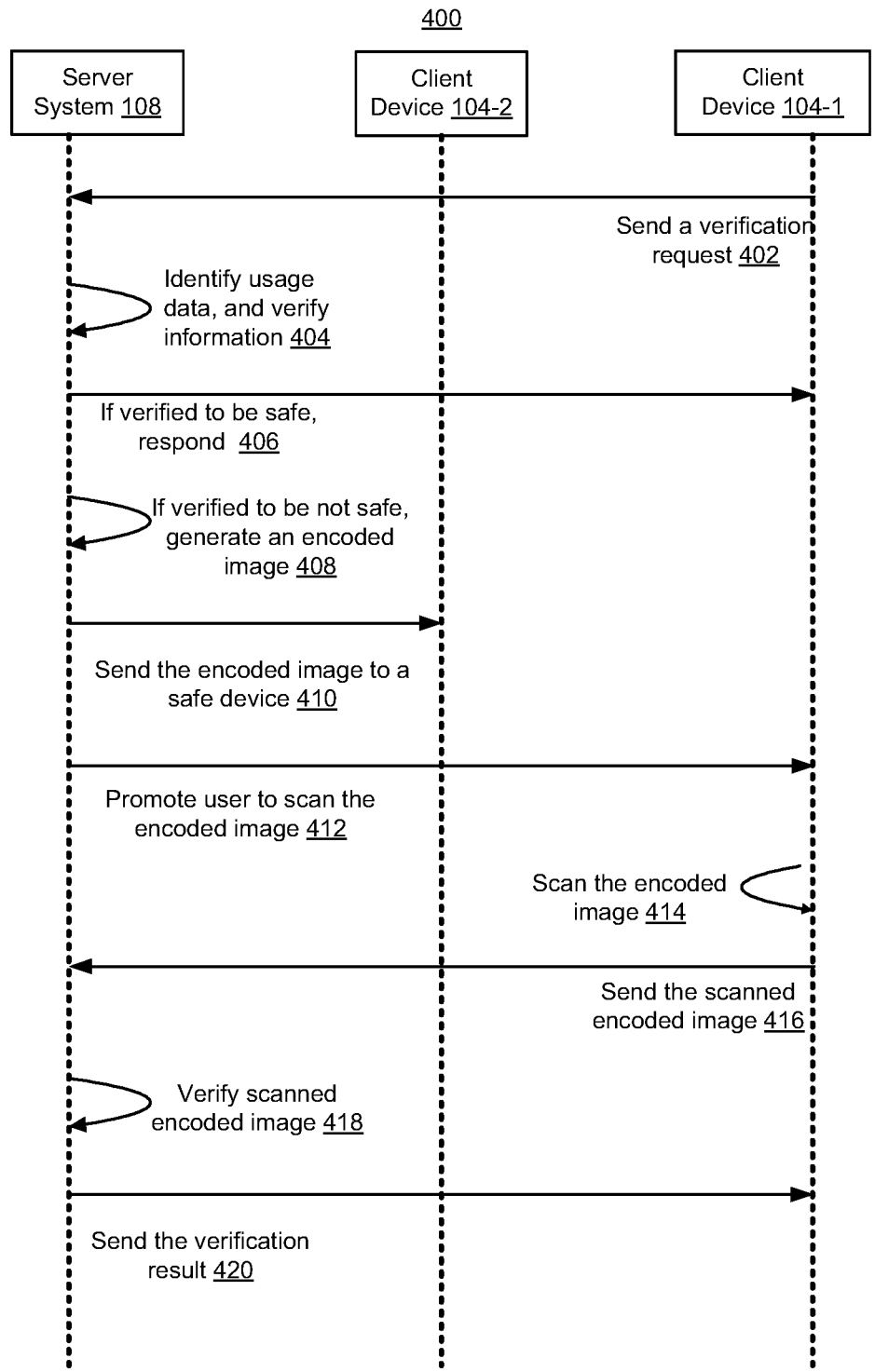
FIG. 4A illustrates a flow diagram of a method of verifying an account operation in accordance with some embodiments.

FIG. 4A illustrates a flow diagram of a method 400 of verifying an account operation in accordance with some embodiments. In some embodiments, method 400 is performed in sever-client environment 100 (FIG. 1) with server system 108, client device 104-1, and client device 104-2, each of which includes one or more processors and memory. As shown in FIG. 4A, client device 104-1 sends (402) a verification request to server system 108 for verifying an account operation. In some embodiments, the verification request includes information associated with the user account and a device ID associated with client device 104-1.

After receiving the verification request, server system 108 identifies (404) usage data of the user account stored at server system 108 (e.g., user account usage data 246, FIG. 2A). Server system 108 then verifies (404) the identified usage data of the user account, for example, by determining whether the account operation associated with the user account on client device 104-1 is safe. In accordance with a determination that the account operation associated with the user account on client device 104-1 is safe, server system 108 responds (406) to client device 104-1 with a positive response to the verification request. In accordance with a determination that the user operation associated with the user account on client device 104-1 is unsafe, server system 108 initiates a verification process based on an interaction between client device 104-2 and client device 104-1. For example, server system 108 generates (408) an encoded image 408 for display on client device 104-2, and promotes the user of client device 104-1 to scan the encoded image. In some embodiments, client device 104-2 is qualified as being safe for the account operation based on the usage history data associated with one or more accounts of the user and one or more predetermined usage history criteria. In some embodiments, server system 108 sends (410) the encoded image to client device 104-2 for display. Server system 108 promotes (412) the user of client device 104-1 to scan the encoded image displayed on client device 104-2.

In some embodiments, client device 104-1 scans (414) the encoded image displayed on client device 104-2, and client device 104-1 sends (416) the scanned encoded image to server system 108.

In some embodiments, server system 108 receives the scanned encoded image from client device 104-1, server system 108 verifies (418) the scanned encoded image. For example, server system 108 determines whether the scanned encoded image matches the encoded image sent to client device 104-2. Server system 108 sends (420) the verification result to client device 104-1. For example, the verification result includes whether the account operation on client device 104-1 is safe corresponding to whether the scanned encoded image matches the encoded image sent to client device 104-2.

Figure 4B:
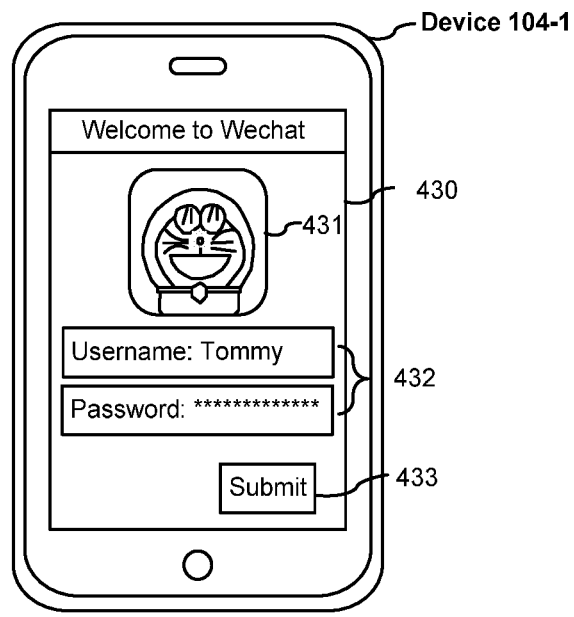
FIGS. 4B-4G are exemplary embodiments of user interfaces of account verification in accordance with some embodiments.

FIG. 4B is an exemplary embodiment of a user interface 430 for login a user account 431 on client device 104-1. User account 431 is associated with the user of client device 104-1. As shown in FIG. 4B, user interface 430 corresponds to an application platform (e.g., WeChat platform). During login user account 431, the user is requested to input login credentials 432, such as the user account name and the password for user account 431. In some embodiments, after pressing the submitting button 433 on user interface 430, a verification request is sent to server system 108 for verification. In some embodiments, the verification request includes the inputted login credentials 432 and device ID of client device 104-1.

Figure 4C:
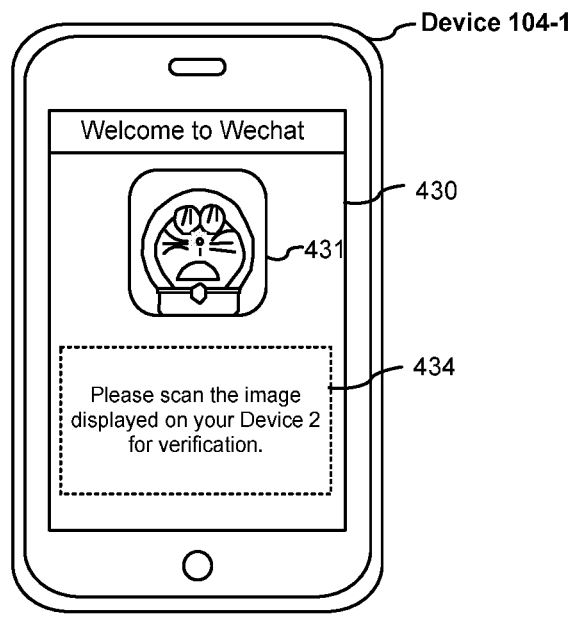

FIG. 4C is an exemplary embodiment of user interface 430 on client device 104-1 during verification. In some embodiments, in accordance with a determination that the login process associated with user account 431 on client device 104-1 is not safe, server system 108 initiates a verification process between client device 104-1 and a client device (e.g., client device 104-2) which qualifies as being safe for the account operation of the user on client device 104-2. In some embodiments, server system 108 promotes the user to scan an encoded image displayed on client device 104-2 by displaying a notification box 434 as shown in FIG. 4C.

Figure 4D:
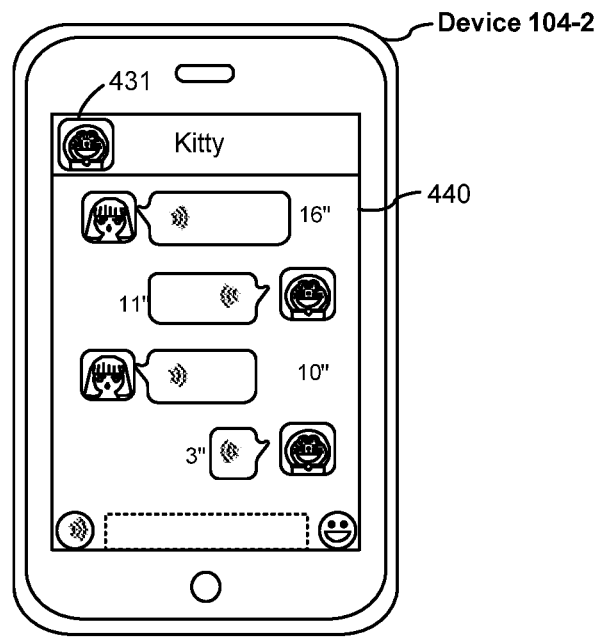

FIG. 4D is an exemplary embodiment of a user interface 440 of the same application platform (e.g., Wechat platform) logged in on client device 104-2. In some embodiments, the Wechat platform is logged in by the same user of client device 104-1 using the same user account 431 on client device 104-2.

Figure 4E:
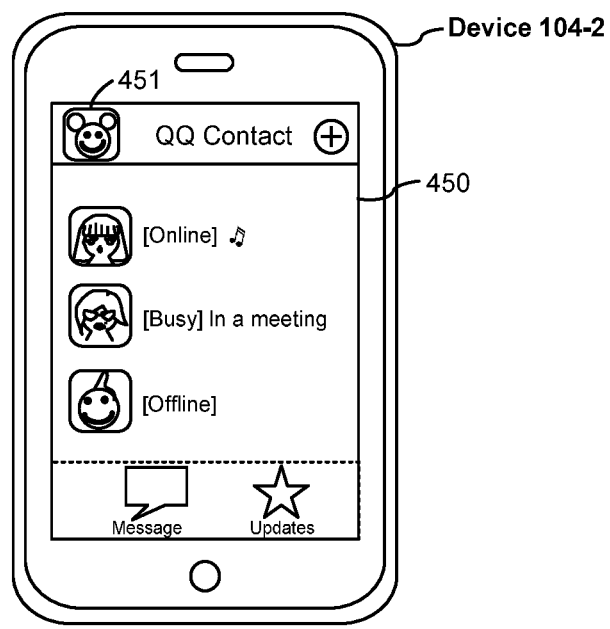

FIG. 4E is an exemplary embodiment of a user interface 450 of a different application platform (e.g., QQ platform) logged in on client device 104-2. In some embodiments, the QQ platform is logged in by the same user of client device 104-1 using a user account 451 on client device 104-2. User account 451 is distinct from user account 431.

Figure 4F:
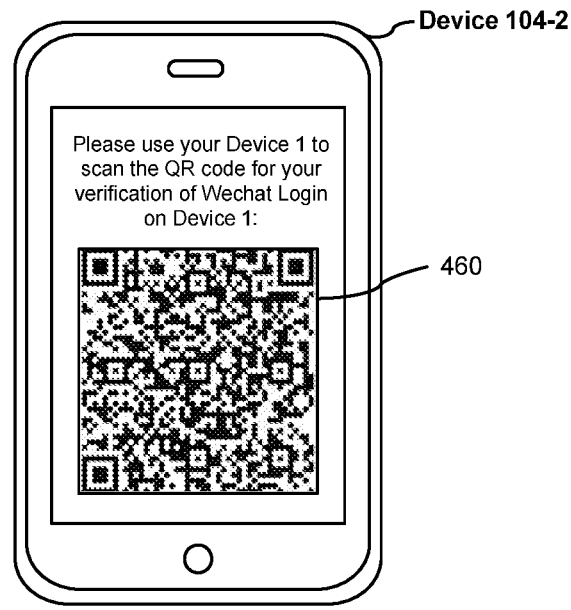

FIG. 4F is an exemplary embodiment of a user interface displaying an encoded image 460 for an interaction verification process between client device 104-1 and client device 104-2. In some embodiments as shown in FIG. 4C, after login credentials 432 are determined to be not safe, server system 108 promotes the user to scan encoded image 460 displayed on client device 104-2 using client device 104-1. Server system 108 generates and sends encoded image 460 for display on client device 104-2 as shown in FIG. 4F.

Although not shown in the figures, in some embodiments, server system 108 detects client device 104-2 is capable of scanning images, but client device 104-1 does not include a functionality to perform scanning. In such implementations, server system 108 sends the encoded image to client device 104-1 for display, and promotes the user to user client device 104-2 to scan the encoded image displayed on client device 104-1.

Figure 4G:
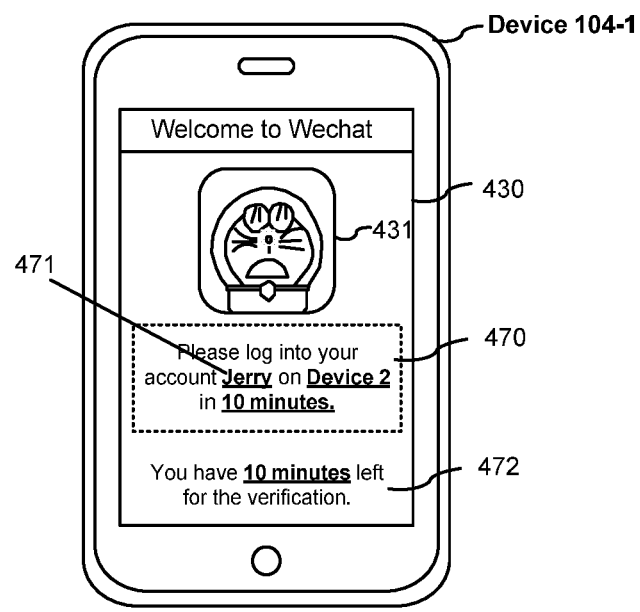

FIG. 4G is an exemplary embodiment of user interface 430 on client device 104-1 during verification. In some embodiments, in accordance with a determination that the login process associated with user account 431 on client device 104-1 is not safe, server system 108 initiates a verification process between client device 104-1 and client device 104-2. In some embodiments as instructed in notification box 470, server system 108 promotes the user to login to a user account 471 which is distinct from user account 431, on a same application platform (e.g., Wechat platform), or a different application platform (e.g., QQ platform), on client device 104-2. In some embodiments as shown in instruction 472, server system 108 requires the user to perform the indicated verification within a predetermined time threshold (e.g., 10 minutes).

FIGS. 5A-5F illustrate a flowchart diagram of a method 500 for verifying an account operation in accordance with some embodiments. In some embodiments, method 500 is performed by server system 108 with one or more processors and memory. For example, in some embodiments, method 500 is performed by server system 108 (FIGS. 1-2A) or a component thereof (e.g., server-side module 106, FIGS. 1-2A). In some embodiments, method 500 is governed by instructions that are stored in a non-transitory computer readable storage medium and the instructions are executed by one or more processors of the server system. Optional operations are indicated by dashed lines (e.g., boxes with dashed-line borders).

In method 500, server system 108 obtains (502) a verification request from a first device (e.g., client device 104-1, FIGS. 1 and 2B) for an account operation requested by a user using a first account (e.g., user account 431, FIG. 4B). In some embodiments, the verification request includes information associated with the first account and a device ID associated with the first device.

In some embodiments, the user is intended to perform an operation on a platform (e.g., platform 430, FIG. 4B) on the first device, a verification request is sent from the first device to server system 108 to determine whether the account operation associated with the first account on the first device is safe. In some embodiments, the account operation includes, but is not limited to: (1) login to an application platform on the first device using a first account, (2) deleting the first account on the first device, (3) modifying the account information of the first account, such as password, account name, etc., (4) inquiring personal privacy information, financial information, and/or identity information, (5) posting personal data to the public, e.g., posting photos or notes stored on the first device to WeChat, etc.

In some embodiments, the verification request includes the first account information, such as the first account name and password used for login, and device ID associated with the first device. In some embodiments, the verification request also includes a login IP address, a login platform (e.g., WeChat, QQ, etc.), and/or a login manner (e.g., from a mobile phone, a tablet, or a PC) which are used for login to the first account on the first device.

Server system 108 identifies (504) usage history data associated with the first account from the server system. In some embodiments, usage history data includes data regarding usage of the first account on the first device.

In some embodiments, after receiving the verification request, server system 108 identifies the first account and the first device based on the device ID included in the verification request, and server system 108 identifies usage history data, in particular, usage history data associated with the usage of the first account performed on the first device. The history data includes history login data and/or history operation data of the first account associated with the first device. In some embodiments, if no such usage data regarding the use of the first account on the first device exists, the fact of no prior usage is indicated for the first device.

Server system 108 determines (506) whether the account operation associated with the first account on the first device is safe, in accordance with the data regarding the usage of the first account on the first device and one or more predetermined usage history criteria. The server may determine whether the operation associated with the first account at the first device is safe by examining the identified history data based on the one or more criteria.

In some embodiments, the one or more predetermined usage history criteria includes: (1) a frequency of the first account attempts to login to the first device within a predetermined time threshold is below a predetermine threshold (e.g., 10 attempts of login within the past ten minutes), (2) a frequency of the first account logs into the first device is greater than a predetermined frequency threshold (e.g., in average 1 time per day), (3) the time of the first user account stays logged-on the first device within a predetermined time threshold is greater than a predetermined value (e.g., 10 hours within the past 15 days), (4) a time between the current login and the last login on the first device using the first account is within a predetermined time span threshold (e.g., no greater than 3 months).

In accordance with a determination that the account operation associated with the first account on the first device is not safe, server system 108 initiates (508) a verification process based on a second device (e.g., client device 104-2, FIG. 1) that qualifies as being safe for the account operation based on the usage history data associated with one or more accounts of the user and the one or more predetermined usage history criteria.

In some embodiments, when the first account on the first device is determined to be not safe based on the relevant history data and the predetermined usage criteria, method 500 proceeds to require additional verification based on a second device that is a safe device for the first account based on the historic usage data regarding the usage of the first account on the second device.

At this time, the second device may be an already logged-on device nearby, and then the login of the user on the second device is verified to be safe by the server. The second device may also be searched first based on the history data stored at the server, and then server system 108 promotes the user to login to the second device. The history data associated with the user on the second device used for safety verification includes: history login records and/or history operation records of the user on the second device using a certain account, which can be the same user account or a different user account from the first account. In some embodiments, the second device may be determined to be associated with, or nearby, the first device by the IP addresses.

Figure 5A:
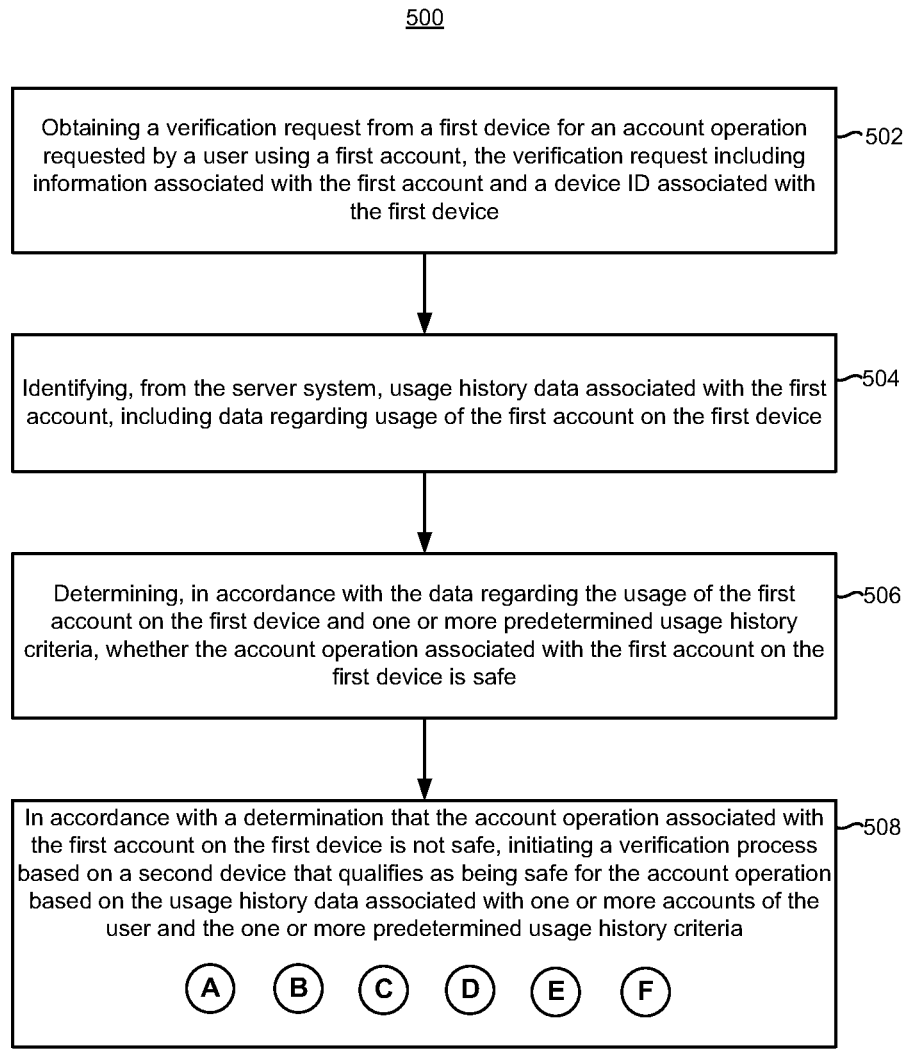
FIGS. 5A-5F are a flowchart diagram of a method for verifying an account operation in accordance with some embodiments.
Figure 5B:
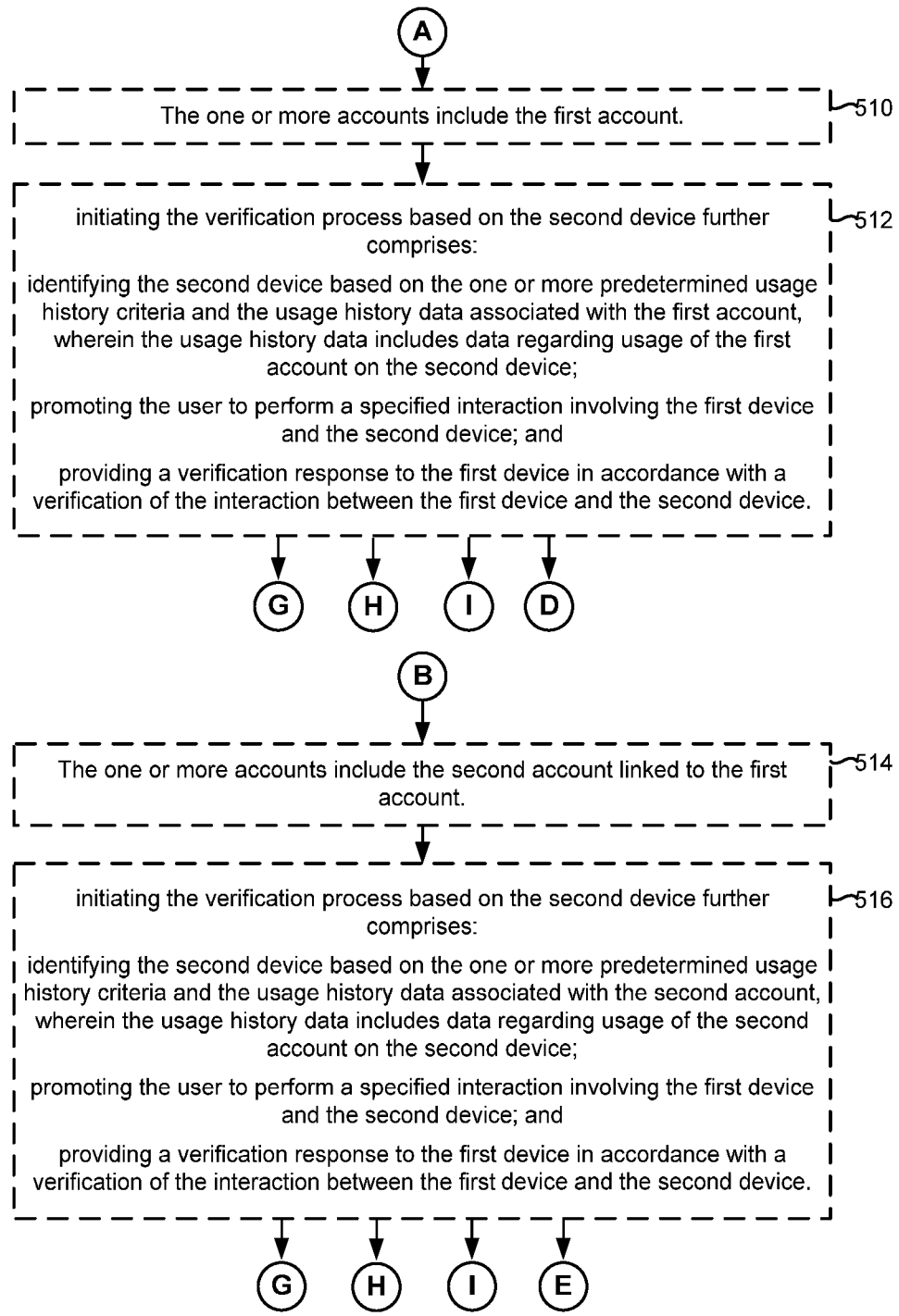

In some embodiments as shown in FIG. 5B, the one or more accounts of the user used for determining the second device qualified as being safe include (510) the first account. In some embodiments, server system 108 initiating (512) the verification process based on the second device further comprises identifying (512) the second device based on the one or more predetermined usage history criteria and the usage history data associated with the first account; promoting (512) the user to perform a specified interaction involving the first device and the second device; and providing (512) a verification response to the first device in accordance with a verification of the interaction between the first device and the second device. In some embodiments, the usage history data includes data regarding usage of the first account on the second device.

Figure 5C:
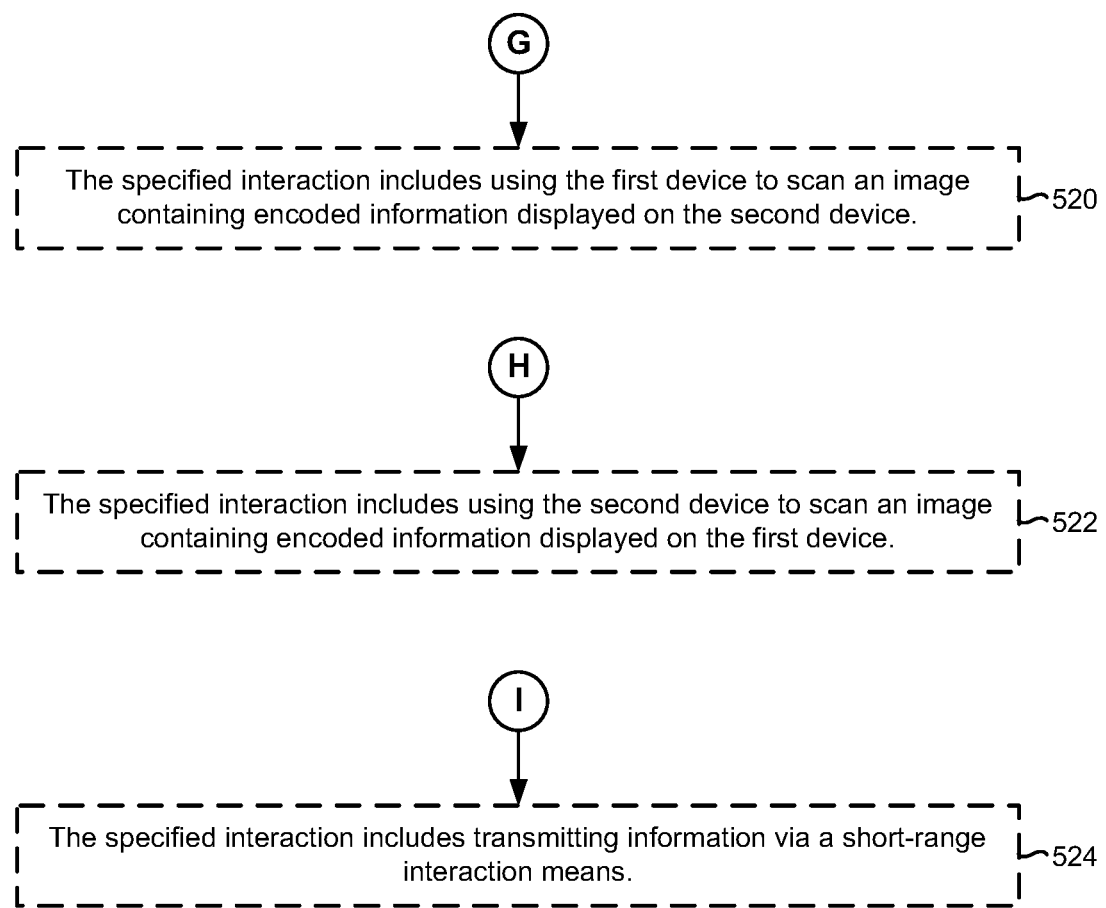

In some embodiments in FIG. 5C, the specified interaction includes (520) using the first device to scan an image containing encoded information displayed on the second device. In some embodiments, the specified interaction includes (522) using the second device to scan an image containing encoded information displayed on the first device. In some embodiments, the specified interaction includes (524) transmitting information via a short-range interaction means. In some embodiments, server system 108 first determines which of the first device and the second device has the scanning capability (e.g., which device has a camera that is capable of scanning), and then decides which device is to receive the encoded image, and which device is to submit the scanned result.

Figure 5D:
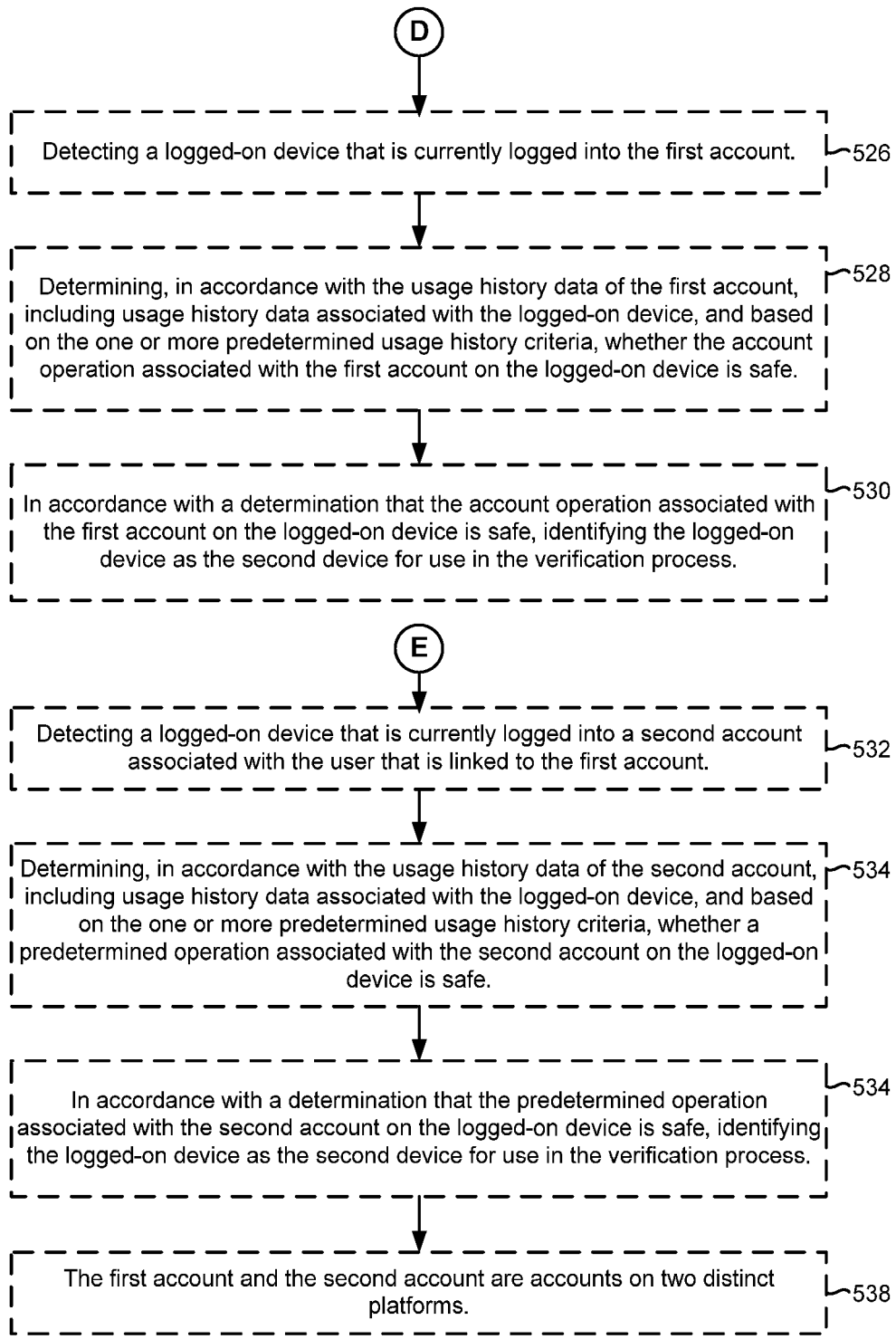

In some embodiments in FIG. 5D, server system 108 detects (526) a logged-on device (e.g., client device 104-2, FIG. 4D) that is currently logged into the first account (e.g, user account 431, FIG. 4D). Server system 108 determines (528) whether the account operation associated with the first account on the logged-on device is safe in accordance with the usage history data of the first account, and based on the one or more predetermined usage history criteria. The usage history data includes usage history data associated with the logged-on device. In accordance with a determination that the account operation associated with the first account on the logged-on device is safe, server system 108 identifies (530) the logged-on device as the second device for use in the verification process.

In some embodiments in FIG. 5B, the one or more accounts of the user used for determining the second device qualified as being safe include (514) the second account linked to the first account. In some embodiments, server system 108 initiating (508) the verification process based on the second device further comprises identifying (516) the second device based on the one or more predetermined usage history criteria and the usage history data associated with the second account; promoting (516) the user to perform a specified interaction involving the first device and the second device; and providing (516) a verification response to the first device in accordance with a verification of the interaction between the first device and the second device. In some embodiments, the usage history data includes (516) data regarding usage of the second account on the second device.

In some embodiments in FIG. 5C, the specified interaction includes (520) using the first device to scan an image containing encoded information displayed on the second device. In some embodiments, the specified interaction includes (522) using the second device to scan an image containing encoded information displayed on the first device. In some embodiments, the specified interaction includes (524) transmitting information via a short-range interaction means. In some embodiments, server system 108 first determines which of the first device and the second device has the scanning capability (e.g., which device has a camera that is capable of scanning), and then decides which device is to receive the encoded image, and which device is to submit the scanned result.

In some embodiments in FIG. 5D, server system 108 detects (532) a logged-on device that is currently logged into a second account associated with the user that is linked to the first account. Server system 108 determines (534) whether a predetermined operation associated with the second account on the logged-on device is safe, in accordance with the usage history data of the second account and based on the one or more predetermined usage history criteria. In some embodiments, the usage history data of the second account includes (534) usage history data associated with the logged-on device. In accordance with a determination that the predetermined operation associated with the second account on the logged-on device is safe, server system 109 identifies (536) the logged-on device as the second device for use in the verification process. In some embodiments, the first account and the second account are (538) accounts on two distinct platforms.

In some embodiments, the first account and the second account are accounts for different operating platforms, rather than a duplicate account of the user on the same platform. In some examples, the first account is a payment account and the second account is a social network account that is linked to the payment account, or vice versa. In some embodiments, the first account and the second account are determined to be associated with the same user by the server. For example, the first account and the second account have been frequently used by the same IP address, on the same device(s), and/or the registered information associated with the first account and the second account share the same information.

Figure 5E:
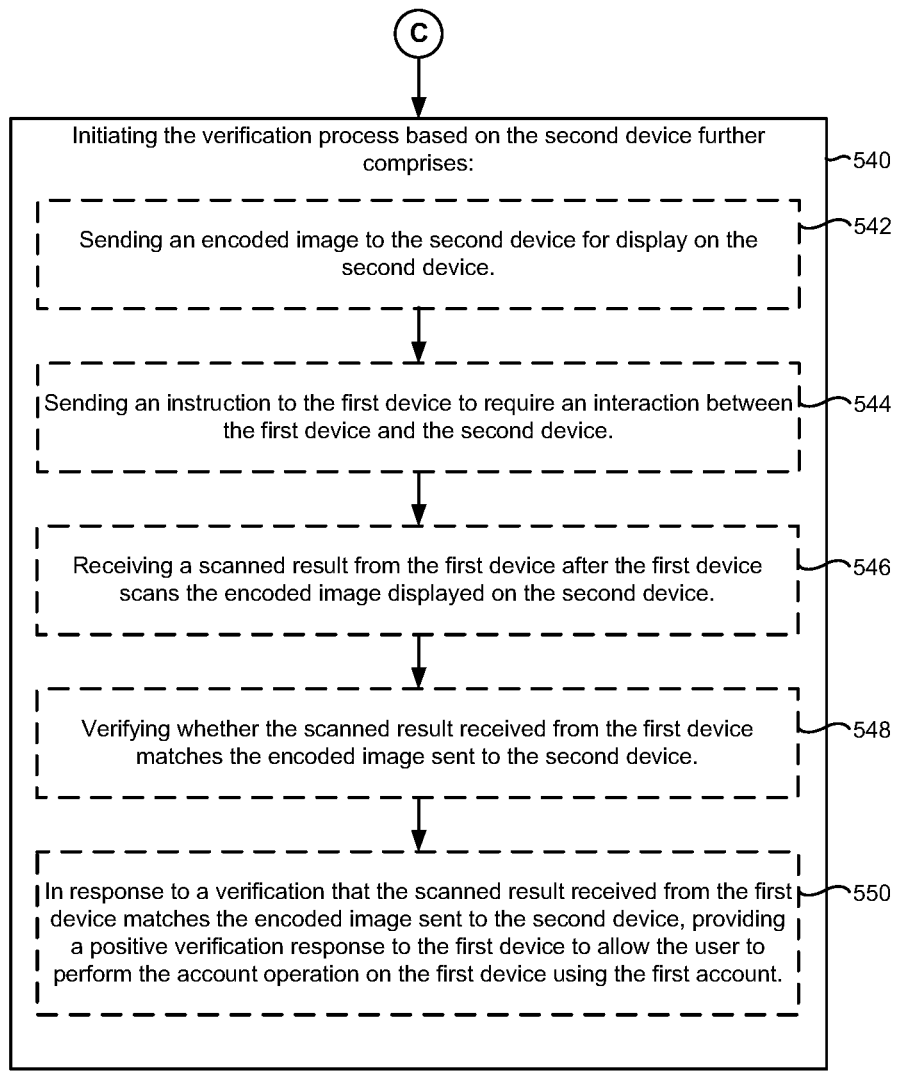

In some embodiments in FIG. 5E, server system 108 sends (542) an encoded image to the second device for display on the second device. In some embodiments, server system 108 sends (544) an instruction (e.g., notification box 434) to the first device to require an interaction between the first device and the second device. In some embodiments, server system 108 receives (546) a scanned result from the first device after the first device scans the encoded image displayed on the second device. In some embodiments, server system 108 verifies (548) whether the scanned result received from the first device matches the encoded image sent to the second device. In response to a verification that the scanned result received from the first device matches the encoded image sent to the second device, server system 108 provides (550) a positive verification response to the first device to allow the user to perform the account operation on the first device using the first account.

In some embodiments, the encoded image includes a 2-D QR code, or a barcode, or any other suitable scannable optical label. In some embodiments, the encoded image is displayed through the interface of the client application corresponding to the first account that is currently logged on at the second device. In some embodiments, if the second device qualifies as safe for a second account linked to the first account, then the encoded image is displayed through the interface of the client application corresponding to the second account that is currently logged on at the second device.

In some embodiments, the second device is the same device as the first device, and the first device qualifies as safe for a second account linked to the first account, in such a case, the encoded image may be copied from the interface of the second account, and pasted into the interface of the first account on the first device. In some embodiments, such copy and paste may not be required, since the server may determine that the first device is deemed safe for a second account that is linked to the first account, and thus provide a positive verification response without requiring the user to do anything.

In some embodiments, the verification includes verifying whether the encoded image sent to the second device matches the image of the scanned label received from the first device, and/or verifying whether the information included in the scanned label received from the first device matches the information included in the label sent to the second device. In some examples, the information included in the scanned label received from the first device may be responsive to or correlated with the information included in the label sent to the second device.

Figure 5F:
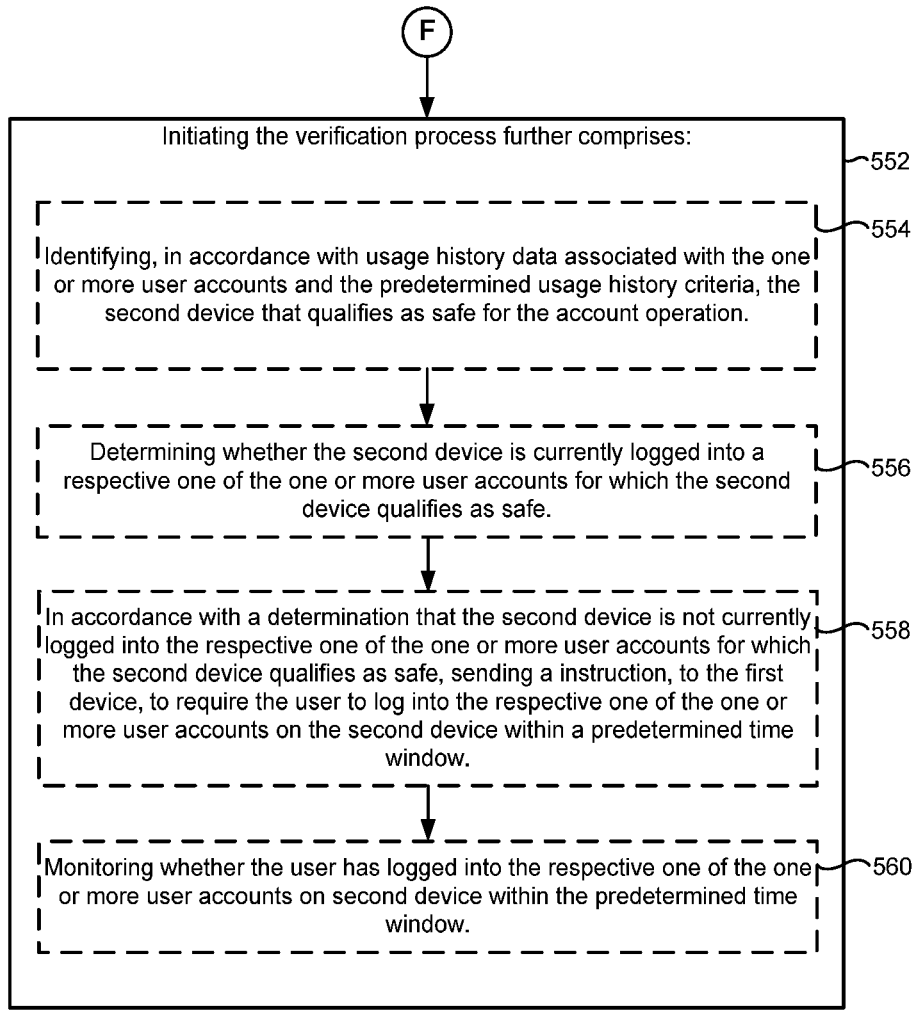

In some embodiments in FIG. 5F, server system 108 identifies (554) the second device that qualifies as safe for the account operation in accordance with usage history data associated with the one or more user accounts and the predetermined usage history criteria. In some embodiments, server system 108 determines (556) whether the second device is currently logged into a respective one of the one or more user accounts for which the second device qualifies as safe. In accordance with a determination that the second device is not currently logged into the respective one of the one or more user accounts for which the second device qualifies as safe, server system sends (558) an instruction (e.g., instruction box 470 of FIG. 4G), to the first device, to require the user to log into the respective one of the one or more user accounts on the second device within a predetermined time window (e.g., instruction 472 of FIG. 4G). In some embodiments, server system 108 monitors (560) whether the user has logged into the respective one of the one or more user accounts on second device within the predetermined time window.

In some embodiments, server system 108 searches the history data in the database to identify a safe second device. The instruction (e.g., instruction box 470 of FIG. 4G) sent to the first device may request for the user to login to the second device using the first account, or any other account associated with the user. In some embodiments, the instruction may not explicitly identify the second device, but instead provide a more cryptic description of the second device, and the user must rely on his/her knowledge of the second device and of his/her past usage of the second device to know which device he must use and which account he or she must log into.

Each of the methods described herein is typically governed by instructions that are stored in a computer readable storage medium and that are executed by one or more processors of one or more servers or client devices. The above identified modules or programs (i.e., sets of instructions) need not be implemented as separate software programs, procedures or modules, and thus various subsets of these modules will be combined or otherwise re-arranged in various embodiments.

The foregoing description, for purpose of explanation, has been described with reference to specific embodiments. However, the illustrative discussions above are not intended to be exhaustive or to limit the disclosed technology to the precise forms disclosed. Many modifications and variations are possible in view of the above teachings. The embodiments were chosen and described in order to best explain the principles of the disclosed technology and its practical applications, to thereby enable others skilled in the art to best utilize the disclosed technology and various embodiments with various modifications as are suited to the particular use contemplated.

What is claimed is:

1. A method for verifying an account operation, comprising:

obtaining, by a server, a verification request from a first device for an account operation requested by a user using a first account, the verification request including information associated with the first account and a device ID associated with the first device;

identifying, by the server, usage history data associated with the first account, including data regarding usage of the first account on the first device;

determining, in accordance with the data regarding the usage of the first account on the first device and one or more predetermined usage history criteria, whether the account operation associated with the first account on the first device is safe; and in accordance with a determination that the account operation associated with the first account on the first device is not safe, initiating a verification process based on a second device that qualifies as being safe for the account operation based on the usage history data associated with the first account of the user and the one or more predetermined usage history criteria, the verification process comprising:

identifying the second device based on the one or more predetermined usage history criteria and the usage history data associated with the first account, wherein the usage history data associated with the first account includes data regarding usage of the first account on the second device;

promoting the user to perform a specified interaction involving the first device and the second device; and providing a verification response to the first device in accordance with a verification of the interaction between the first device and the second device.

2. The method of claim 1, wherein the specified interaction includes at least one of: using the first device to scan an image containing encoded information displayed on the second device, using the second device to scan an image containing encoded information displayed on the first device, or transmitting information via a short-range interaction means.

3. The method of claim 1, wherein initiating the verification process based on the second device further comprises:
sending an encoded image to the second device for display on the second device;
sending an instruction to the first device to require an interaction between the first device and the second device;
receiving a scanned result from the first device after the first device scans the encoded image displayed on the second device;
verifying whether the scanned result received from the first device matches the encoded image sent to the second device; and
in response to a verification that the scanned result received from the first device matches the encoded image sent to the second device, providing a positive verification response to the first device to allow the user to perform the account operation on the first device using the first account.

4. The method of claim 1, further comprising:
detecting a logged-on device that is currently logged into the first account;
determining, in accordance with the usage history data of the first account which includes usage history data of the first account associated with the logged-on device, and based on the one or more predetermined usage history criteria, whether the account operation associated with the first account on the logged-on device is safe; and
in accordance with a determination that the account operation associated with the first account on the logged-on device is safe, identifying the logged-on device as the second device for use in the verification process.

5. The method of claim 4, wherein:
the usage history data of the first account associated with the logged-on device includes at least one of a login frequency within a preset period or a usage duration of the first account on the logged-on device;
the one or more predetermined usage history criteria includes at least one of a threshold frequency or a threshold usage duration; and
the account operation associated with the first account on the logged-on device is determined as safe when determining at least one of: the login frequency within the preset period being not less than the threshold frequency, or the usage duration being not less than the threshold usage duration.

6. The method of claim 1, further comprising:
detecting a logged-on device that is currently logged into a second account associated with the user that is linked to the first account;
determining, in accordance with usage history data of the second account which includes usage history data of the second account associated with the logged-on device, and based on the one or more predetermined usage history criteria, whether a predetermined operation associated with the second account on the logged-on device is safe; and
in accordance with a determination that the predetermined operation associated with the second account on the logged-on device is safe, identifying the logged-on device as the second device for use in the verification process.

7. The method of claim 6, wherein the first account and the second account are accounts on two distinct platforms.

8. The method of claim 6, wherein:
the usage history data of the second account associated with the logged-on device includes at least one of a login frequency within a preset period or a usage duration of the second account on the logged-on device;
the one or more predetermined usage history criteria includes at least one of a threshold frequency or a threshold usage duration; and
the account operation associated with the second account on the logged-on device is determined as safe when determining at least one of: the login frequency within the preset period being not less than the threshold frequency, or the usage duration being not less than the threshold usage duration.

9. The method of claim 1, wherein initiating the verification process further comprises:
identifying, in accordance with usage history data associated with one or more user accounts and the predetermined usage history criteria, the second device that qualifies as safe for the account operation;
determining whether the second device is currently logged into a respective one of the one or more user accounts for which the second device qualifies as safe;
in accordance with a determination that the second device is not currently logged into the respective one of the one or more user accounts for which the second device qualifies as safe, sending an instruction, to the first device, to require the user to log into the respective one of the one or more user accounts on the second device within a predetermined time window; and
monitoring whether the user has logged into the respective one of the one or more user accounts on second device within the predetermined time window.

10. A server, comprising:
one or more processors; and
memory storing one or more programs to be executed by the one or more processors, wherein the one or more processors are configured to:
obtain a verification request from a first device for an account operation requested by a user using a first account, the verification request including information associated with the first account and a device ID associated with the first device;
identify usage history data associated with the first account, including data regarding usage of the first account on the first device;
determine, in accordance with the data regarding the usage of the first account on the first device and one or more predetermined usage history criteria, whether the account operation associated with the first account on the first device is safe; and
in accordance with a determination that the account operation associated with the first account on the first device is not safe, initiate a verification process based on a second device that qualifies as being safe for the account operation based on the usage history data associated with the first account of the user and the one or more predetermined usage history criteria, the verification process comprising:
identifying the second device based on the one or more predetermined usage history criteria and the usage history data associated with the first account, wherein the usage history data associated with the first account includes data regarding usage of the first account on the second device;

promoting the user to perform a specified interaction involving the first device and the second device; and providing a verification response to the first device in accordance with a verification of the interaction between the first device and the second device.

11. The server of claim 10, wherein the verification process further comprises:

identifying, in accordance with usage history data associated with the one or more user accounts and the predetermined usage history criteria, the second device that qualifies as safe for the account operation;

determining whether the second device is currently logged into a respective one of the one or more user accounts for which the second device qualifies as safe;

in accordance with a determination that the second device is not currently logged into the respective one of the one or more user accounts for which the second device qualifies as safe, sending an instruction, to the first device, to require the user to log into the respective one of the one or more user accounts on the second device within a predetermined time window; and monitoring whether the user has logged into the respective one of the one or more user accounts on second device within the predetermined time window.

12. A non-transitory computer readable storage medium storing one or more programs, the one or more programs comprising instructions, which, when being executed by a server with one or more processors, cause the server to perform operations comprising:

obtaining, by a server, a verification request from a first device for an account operation requested by a user using a first account, the verification request including information associated with the first account and a device ID associated with the first device;

identifying, by the server, usage history data associated with the first account, including data regarding usage of the first account on the first device;

determining, in accordance with the data regarding the usage of the first account on the first device and one or more predetermined usage history criteria, whether the account operation associated with the first account on the first device is safe; and in accordance with a determination that the account operation associated with the first account on the first device is not safe, initiating a verification process based on a second device that qualifies as being safe for the account operation based on the usage history data associated with the first account of the user and the one or more predetermined usage history criteria, the verification process comprising:

identifying the second device based on the one or more predetermined usage history criteria and the usage history data associated with the first account, wherein the usage history data associated with the first account includes data regarding usage of the first account on the second device;

promoting the user to perform a specified interaction involving the first device and the second device; and providing a verification response to the first device in accordance with a verification of the interaction between the first device and the second device.

13. The storage medium of claim 12, wherein the specified interaction includes at least one of: using the first device to scan an image containing encoded information displayed on the second device, using the second device to scan an image containing encoded information displayed on the first device, or transmitting information via a short-range interaction means.

14. The storage medium of claim 12, wherein initiating the verification process based on the second device further comprises:

sending an encoded image to the second device for display on the second device;

sending an instruction to the first device to require an interaction between the first device and the second device;

receiving a scanned result from the first device after the first device scans the encoded image displayed on the second device;

verifying whether the scanned result received from the first device matches the encoded image sent to the second device; and in response to a verification that the scanned result received from the first device matches the encoded image sent to the second device, providing a positive verification response to the first device to allow the user to perform the account operation on the first device using the first account.

15. The storage medium of claim 12, wherein the instructions further cause the server system to perform:

detecting a logged-on device that is currently logged into the first account;

determining, in accordance with the usage history data of the first account which includes usage history data of the first account associated with the logged-on device, and based on the one or more predetermined usage history criteria, whether the account operation associated with the first account on the logged-on device is safe; and in accordance with a determination that the account operation associated with the first account on the logged-on device is safe, identifying the logged-on device as the second device for use in the verification process.

16. The storage medium of claim 15, wherein:

the usage history data of the first account associated with the logged-on device includes at least one of a login frequency within a preset period or a usage duration of the first account on the logged-on device;

the one or more predetermined usage history criteria includes at least one of a threshold frequency or a threshold usage duration; and the account operation associated with the first account on the logged-on device is determined as safe when determining at least one of: the login frequency within the preset period being not less than the threshold frequency, or the usage duration being not less than the threshold usage duration.

17. The storage medium of claim 12, wherein the instructions further cause the server system to perform:

detecting a logged-on device that is currently logged into a second account associated with the user that is linked to the first account;

determining, in accordance with usage history data of the second account which includes usage history data of the second account associated with the logged-on device, and based on the one or more predetermined usage history criteria, whether a predetermined operation associated with the second account on the logged-on device is safe; and in accordance with a determination that the predetermined operation associated with the second account on the logged-on device is safe, identifying the logged-on device as the second device for use in the verification process.

18. The storage medium of claim 17, wherein the first account and the second account are accounts on two distinct platforms.

19. The storage medium of claim 17, wherein:
the usage history data of the second account associated with the logged-on device includes at least one of a login frequency within a preset period or a usage duration of the second account on the logged-on device;
the one or more predetermined usage history criteria includes at least one of a threshold frequency or a threshold usage duration; and
the account operation associated with the second account on the logged-on device is determined as safe when determining at least one of: the login frequency within the preset period being not less than the threshold frequency, or the usage duration being not less than the threshold usage duration.

20. The storage medium of claim 12, wherein initiating the verification process further comprises:
identifying, in accordance with usage history data associated with one or more user accounts and the predetermined usage history criteria, the second device that qualifies as safe for the account operation;
determining whether the second device is currently logged into a respective one of the one or more user accounts for which the second device qualifies as safe;
in accordance with a determination that the second device is not currently logged into the respective one of the one or more user accounts for which the second device qualifies as safe, sending an instruction, to the first device, to require the user to log into the respective one of the one or more user accounts on the second device within a predetermined time window; and
monitoring whether the user has logged into the respective one of the one or more user accounts on second device within the predetermined time window.

* * * * *